June 14, 1966 — A. N. ANDERSON — 3,255,531
MEASURING TAPE
Filed April 14, 1954 — 4 Sheets-Sheet 1
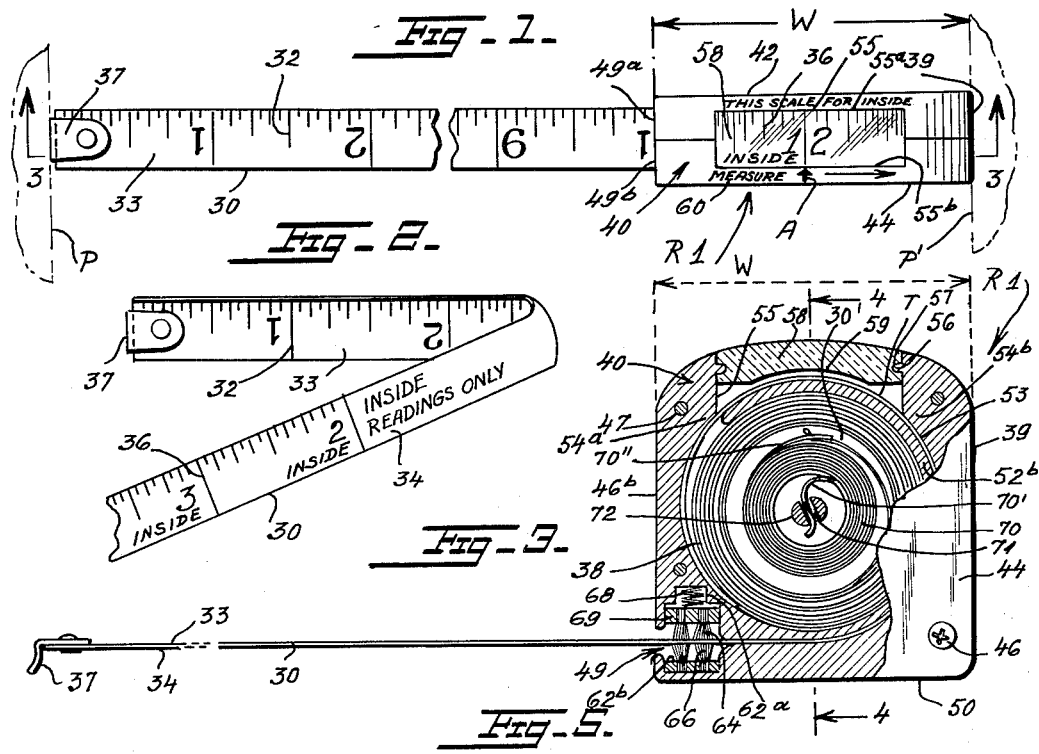
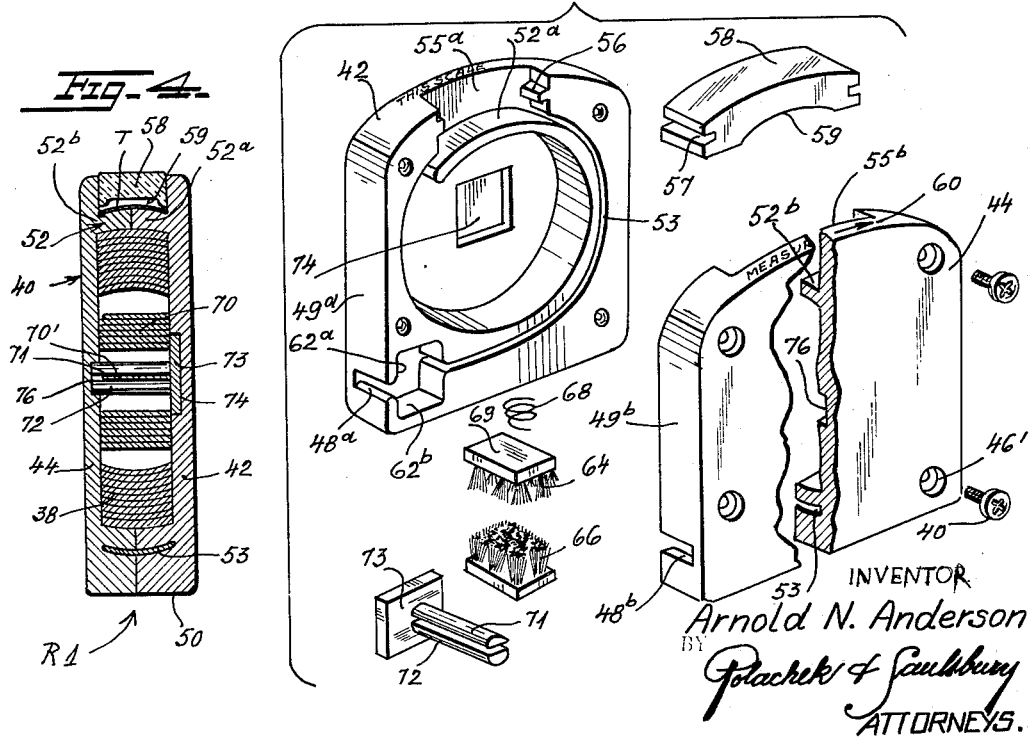
INVENTOR
Arnold N. Anderson
BY Polachek & Saulsbury
ATTORNEYS.

June 14, 1966 A. N. ANDERSON 3,255,531
MEASURING TAPE
Filed April 14, 1954 4 Sheets-Sheet 2
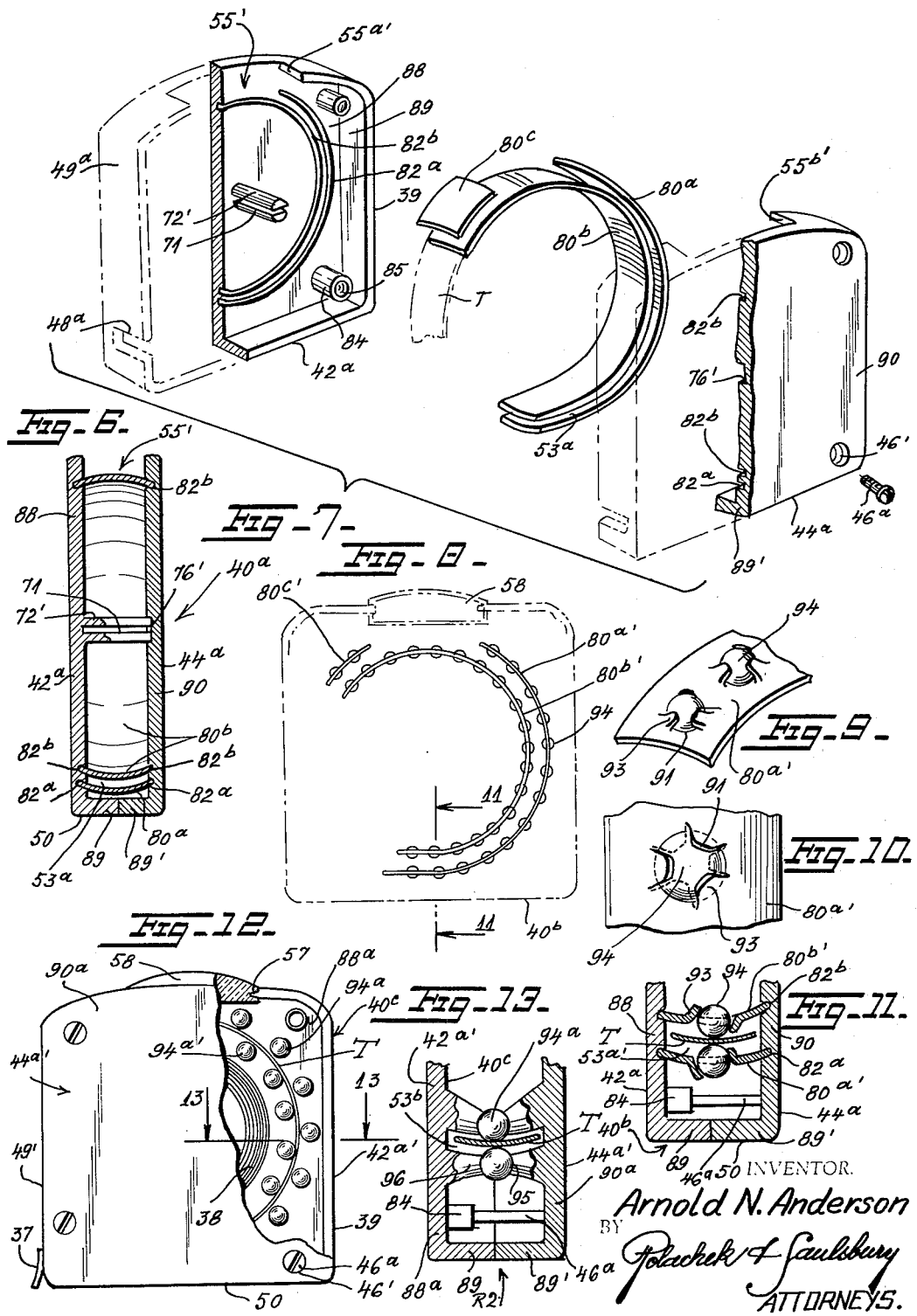

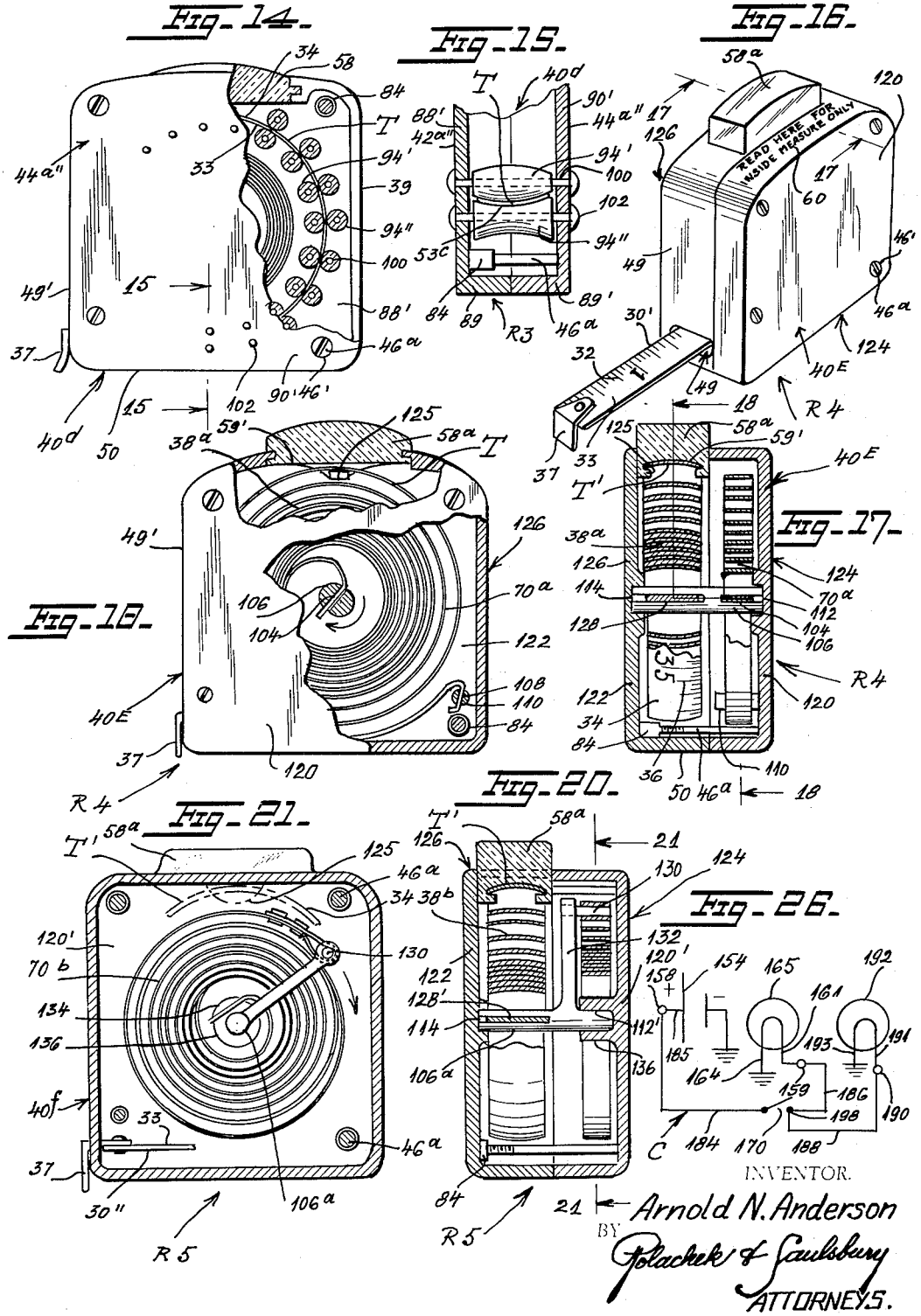

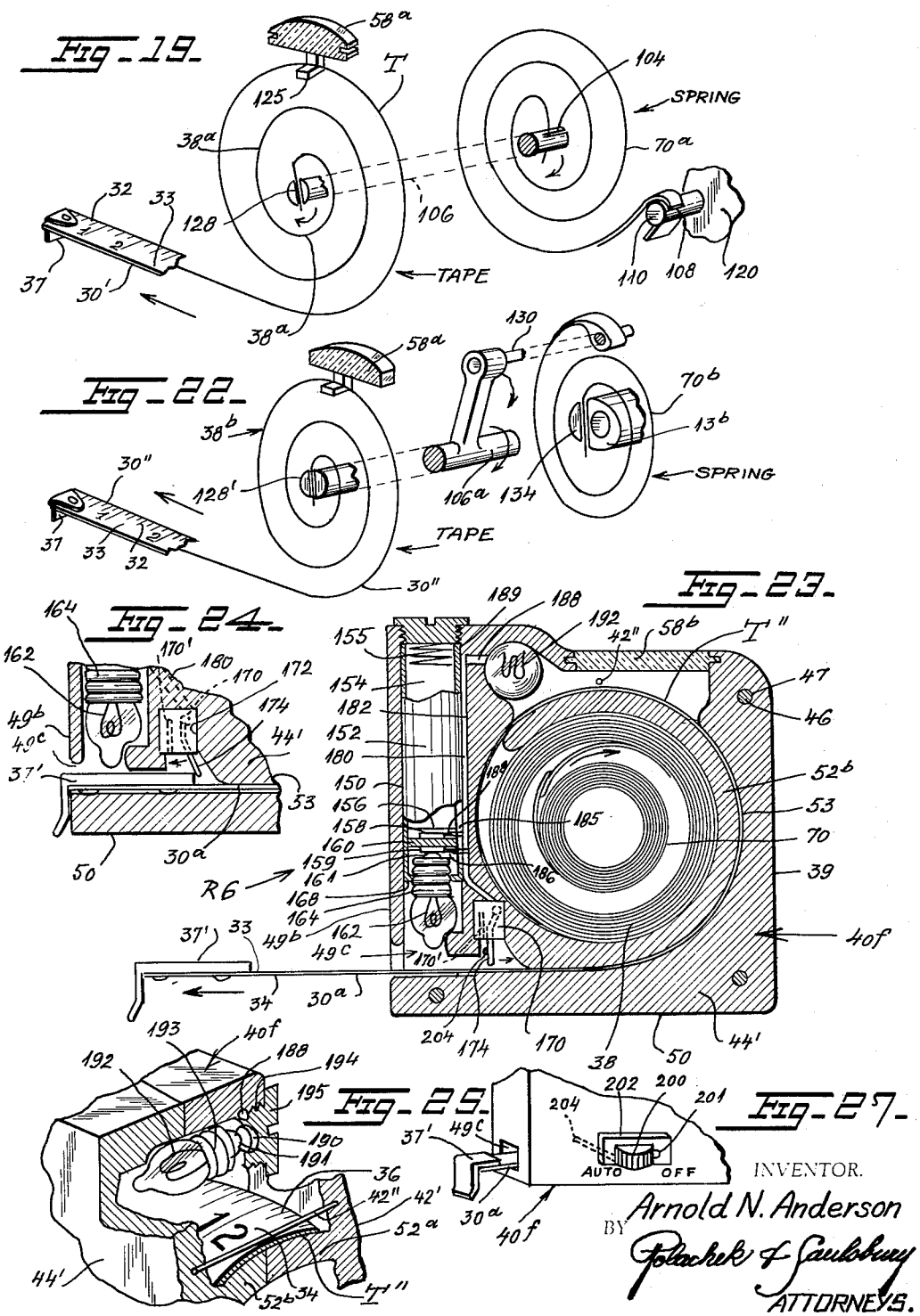

United States Patent Office 3,255,531
Patented June 14, 1966

3,255,531
MEASURING TAPE
Arnold N. Anderson, 6 Wyoming Drive, Hazlet, N.J.
Filed Apr. 14, 1964, Ser. No. 359,711
3 Claims. (Cl. 33—138)

This invention relates generally to measuring tapes and more particularly concerns a tape device in which the tape is coiled in a housing and is withdrawn therefrom for making measurements.

Measuring tapes of the character described have been known heretofore in which measurements taken in exposed places are easily read on such a tape, the measurement being determined by the reading at a point where the tape protrudes from the housing. When it is necessary to take an inside measurement, that is, a measurement between two members between which the tape is stretched, it is necessary to add to the measurement that shows on the tape a distance equal to the width of the housing in order to obtain the proper dimension. However, this addition to the measurement that is being read is frequently forgotten. Thus, if the width of the housing is two inches as is often the case, the measurement read on the tape is two inches short and this causes error, as can be well understood. Various expedients have been proposed to remind the user to add the width of the housing to the dimension read on the tape when making an inside measurement, such as movable or stationary signs and signals. These expedients do not overcome the objection that the user must perform a mental addition to obtain the final correct reading. Furthermore, the size of the housing is limited to a precise, easily added dimension so that other sizes of housings which may in some instances be desirable, cannot be used.

The present invention overcomes the above and other difficulties and disadvantages by providing an improved tape measuring device which is direct reading for inside and outside dimensions. According to the invention, the flexible tape has the usual ruled scale on one side, and a special compensating scale on the back or reverse side which is used primarily for inside measurements. The housing for the tape has a window in one side in which the compensating scale on the reverse side of the tape is exposed for direct reading of inside dimensions, unless it is desirable to use the distance from the side edge of the case adjacent to the mouth of the tape tip on measuring outside dimensions. In this case, the casing edge would be in line with the end of the object being measured and the measurement would not be read in the top window. A lens may be provided at the window with a hairline for very accurate direct readings. A coil spring may be provided inside the housing concentric with the tape for automatically retracting the tape. This spring may be concentric with the coiled tape or in a modification of the invention may be located alongside the coiled tape in axial alignment therewith. This latter arrangement makes it possible to install a longer tape in a housing of particular size than is possible when the coil spring is located inside the wound tape.

In order to insure maximum accuracy of inside measurements, the tape is passed through a rigid guide channel inside the housing. To facilitate movement of the tape through this channel guide ball bearings may be provided. The housing and/or the channel may be made of metal or plastic parts which are stamped, cast or molded.

Brushes may be provided in the housing for wiping both sides of the tape as the tape is moved in and out of the housing, and to reduce wear on the tape faces at the tape mouth, thus preserving the readability of printed numbers. Lamps may be provided in the housing for illuminating the scales on the tape at critical reading points.

It is, therefore, a principal object of the invention to provide an improved tape measuring device which provides direct reading for both inside and outside dimensions.

Another object is to provide an improved tape measuring device including a flexible tape carried in a housing and extensible therefrom, a tape having a direct reading scale on one side for measuring dimensions between outside points and having a direct reading scale on its reverse side for measuring dimensions between inside points.

A further object is to provide an improved tape measuring device as described, wherein the direct reading scale for inside measurements is read only through a window in the housing, the housing length being automatically compensated.

Another object is to provide an improved tape measuring device as described with guide and bearing means for the tape inside the housing to facilitate movement of the tape past the window and to insure accuracy of readings to inside measurements.

Still another object is to provide an improved tape measuring device with a coil spring inside the housing placed laterally of the coiled tape so that a longer tape may be located inside the same housing.

Still further objects are: to provide an improved tape measuring device including brushes for wiping scales on opposite sides of the tape; to provide illuminating lamps for the scales; to provide improved housing structures for the tape and spring; and to provide a tape measuring device capable of indicating inside measurements directly and independently of the case dimensions, since the direct reading inside measurement scale is compensated for the width of the housing of the tape.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a top plan view of a tape measuring rule embodying the invention, part of the tape being broken away.

FIG. 2 is a perspective view of an end portion of the tape, the tape being folded to show scales on opposite sides.

FIG. 3 is a sectional view taken on line 3—3 of FIG. 1.

FIG. 4 is an enlarged sectional view taken on line 4—4 of FIG. 3.

FIG. 5 is an exploded perspective view of the housing of the rule of FIGS. 1–4, and associated parts.

FIG. 6 is a sectional view of another rule housing according to the invention.

FIG. 7 is an exploded perspective view of parts of the rule housing of FIG. 6.

FIG. 8 is a side view of a tape guide with parts of an associated tape housing shown in dotted lines.

FIG. 9 is a fragmentary enlarged perspective view of a portion of the tape guide of FIG. 8.

FIG. 10 is a fragmentary enlarged plan view of a portion of the tape guide of FIGS. 8 and 9.

FIG. 11 is an enlarged sectional view taken on line 11—11 of FIG. 8, including the tape guide, tape and housing.

FIG. 12 is a side elevational view, partially in section, with a portion of the housing broken away, of another rule embodying a modified form of the invention.

FIG. 13 is an enlarged fragmentary sectional view taken on line 13—13 of FIG. 12.

FIG. 14 is a side view, similar to FIG. 12, of a rule embodying another form of the invention.

FIG. 15 is an enlarged fragmentary sectional view taken on line 15—15 of FIG. 14.

FIG. 16 is an external perspective view of another tape measuring rule.

FIG. 17 is an enlarged cross-sectional view taken on line 17—17 of FIG. 16.

FIG. 18 is a sectional view taken on line 18—18 of FIG. 17, parts being shown in side elevation.

FIG. 19 is an exploded perspective view, partially schematic in form, of the tape, spring and associated parts, of the rule of FIGS. 16–18.

FIG. 20 is a sectional view similar to FIG. 17 illustrating a further form of the invention.

FIG. 21 is a sectional view taken on line 21—21 of FIG. 20.

FIG. 22 is an exploded perspective view, similar to FIG. 19 showing parts of the rule of FIGS. 20 and 21.

FIG. 23 is a vertical sectional view similar to FIG. 3, showing another embodiment of the invention.

FIG. 24 is an enlarged view of a portion of FIG. 23.

FIG. 25 is a fragmentary perspective view of part of the rule of FIG. 23, with portions shown in section and portions broken away.

FIG. 26 is a diagram of an electric circuit employed in the rule of FIG. 23.

FIG. 27 is a detail perspective view of a modified form of switch for holding the circuit through the lamp in off condition.

Referring first to FIGS. 1–5, there is shown a tape device R1 including a thin, flexible metal tape 30. A scale 32 is ruled on one side 33 of the tape. This scale is used for making measurement between outside points. On the reverse side 34 of the tape is ruled another scale 36 which is used in making measurements between inside points P' from hook 37 to rear wall 39 of housing 40. The tape is coiled into a roll 38 inside housing 40. The housing is made of two dished plates 42, 44. The two housing plates are abutted and secured together by screws 46 to make a closed, complete housing for the tape. The screws extend through holes 47 into threaded holes of plate 42. Heads of the screws seat in recesses 46'. Notches 48a, 48b at narrow front walls 49a, 49b of the housing plates 42 and 44 define an opening 49 through which the tape can be extended from the housing and retracted into the housing. The housing has a flat bottom 50.

The last turn T of the tape within the housing passes around a guide wall 52. This wall is formed by two laterally extending opposing arcuate wall portions 52a, 52b integral with the inner opposing sides of the housing plates. A curved guide groove 53 is defined between the convex outer side of wall 52 and inner concave side of wall portions 54a, 54b integral with the housing plates 42, 44. The turn T passes through groove 53 and over the top of guide wall 52. A window opening 55 is defined by two recesses 55a, 55b formed at upper ends of the housing parts. Ridges 56 project in these recesses and interfit with grooves 57 formed at opposite ends of a curved transparent lens 58. The lens has a concave side 59 facing the reverse side of the tape so that scale 36 is visible through the lens as shown in FIG. 1. Scale 36 is upside down relative to scale 32 so that when the tape is fully retracted the scale 36 reading in window 55 includes the width W of the housing 40 at index arrow A on the top of the housing. This is the minimum reading of scale 36 and is indicated as "2" inches in FIG. 2. If the housing had a greater or lesser width, then this width would be the minimum reading of scale 36. In any case, when the tape 30 is extended the scale 32 on the upper side 33 is read for outside measurements, but for inside measurements only bottom scale 36 on lower side 34 is read at lens 58 as directed by instructions 60 on the top of the case.

The tape has a generally curved cross-sectional configuration as clearly shown in FIG. 4. The wall 52 and groove 53 are correspondingly curved in cross section.

Opposing upper and lower recesses 62a, 62b are formed in the housing plates for receiving small brushes 64, 66. A coil spring 68 bears on the back 69 of the upper brush to press it into contact with the upper side of the tape while the lower brush contacts the bottom or reverse side of the brush. The bristles of the brushes wipe the opposite sides of the tape clean when it is being extended and retracted, and thus helps to reduce wear on the faces of the tape sides.

A coil spring 70 is provided in the housing. This spring is concentrically located inside the coiled tape roll 38. The inner end 70' of the spring is engaged in a slot 71 of a pin 72 which is axially secured to a rectangular base plate 73. Plate 73 fits nonrotatably in a rectangular recess 74 formed in housing plate 42. Housing plate 44 has a blind bore 76 which receives the free end of pin 72. The outer end 70" of the spring is secured to the inner end 30' of the tape as clearly shown in FIG. 3. The spring is tensioned by uncoiling as the tape is withdrawn from the housing and the spring automatically recoils to retract the tape when the tape is released. Pin 72, of course, remains stationary during the uncoiling and recoiling of the spring.

It will be apparent from the foregoing description of the rule R1, that accurate inside measurements are made with scale 36, without the necessity of adding to the reading on scale 32, the width W of the housing. This is a very great convenience. The housing itself is not necessarily limited to a width of two inches or any other particular width. This permits greater latitude in manufacturing, since the housing can be made larger or smaller for holding longer or shorter tapes. In any case, the positioning of scale 36 with respect to the hook 37 on the end of the tape determines the reading at lens 58. Lens 58 can be a magnifying lens to increase legibility of the scale reading. The rule is readily assembled and disassembled as indicated in FIG. 5. Thus the brushes or other parts can readily be replaced or cleaned whenever desired. The plates 42, 44 can be made quite economically by casting on mass production machinery. The plates can be made of metal or plastic.

In FIGS. 6 and 7 is shown a housing 40a, which can be substituted for housing 40 in rule R1 described above. In housing 40a, two arcuate plates 80a, 80b are provided as separate members inserted in arcuate parallel grooves 82a, 82b of housing plates 42a, 44a. The plates 80a, 80b are spaced apart to define a passage 53a through which the turn T of tape 30 will be passed for reading at window 55' defined by recesses 55a', 55b'. The upper end of plate 80a terminates at window 55' and an additional arcuate plate 80c can be provided in a groove at the other end of the window to extend concentrically with plate 80b. Bosses 84, each with a threaded hole 85, receive screws 46a, after passage through holes 46'. Pin 72' on which the inner end of spring 70 is to be secured is formed integral with plate 42a and its free end seats in blind bore 76' formed on the inner side of plate 44a. Plates 42a and 44a are simpler in structure than plates 42, 44 of housing 40. Plate 42a has a flat outer wall 88 and a peripheral narrow wall 89. Plate 44a has a flat outer wall 90 and a peripheral narrow wall 89' which lines up with wall 89 in registration. FIG. 6 is a sectional view of the assembled housing 40a in vertical central cross section generally similar to FIG. 4. It shows the free end of pin 72' engaged in bore 76' and plates 80a, 80b engaged in grooves 82a, 82b. Other parts corresponding to those of housing 40 are identically numbered.

In FIGS. 8–11 there is shown housing 40b which can be used in place of either housings 40 or 40a. This housing has a guide structure for the outside turn T of tape 30 formed of arcuate plates 80a', 80b' and 80c' similar to plates 80a, 80b and 80c of housing 40a. Plates 80a', 80b' and 80c' are seated in grooves 82a, 82b in opposing side walls 88, 90 of housing plates 42a, 44a. A plurality of holes 91 are formed in each of the arcuate plates. These holes are spaced apart circumferentially of the plates and have tongues 93 struck alternately inwardly and outwardly of each plate around each hole. The ball bearings support and guide turn T of the tape 30 so that it moves freely in the arcuate passage 53a' between the concentric arcuate plates. Other parts of housing 40b corresponding to those of housings 40 and 40a are identically numbered.

In FIGS. 12 and 13, the guide means for the outside turn T of tape roll 38 in housing 40c is defined by opposing arcuate rows of ball bearings 94a, 94a' rotatably seated in concave sears 95 at inner opposing ends of bearing projections 96 integrally formed with inner sides of walls 88a, 90a of the housing plates 42a', 44a'. The ball bearings define an arcuate passage 53b therebetween through which turn T freely passes. Thus the scale 36 on the reverse side of the tape reads accurately when inside dimensions are taken. Other parts of rule R2 corresponding to those of rule R1 and housings 40a, 40b are identically numbered.

In FIGS. 14 and 15 is shown rule R3 which is similar to rule R2 and corresponding parts are identically numbered. In this rule, an inner arcuate row of convex roller bearings 94' is slightly spaced from an outer arcuate row of concave roller bearings 94" to define a narrow arcuate passage 53c. The bearings are rotatably carried by shafts 100 anchored at their heads 102 on outer sides of the side walls 88', 90' of plates 42a", 44a" of the housing 40d. The mating convex and concave sides of the bearings insures close contact with the opposite sides of the turn T of the tape which is curved in cross section.

Rule R4 shown in FIGS. 16–19 has a housing 40E which is thicker than housing 40 of rule R1. In housing 40E, coil spring 70a is disposed at one side of the roll 38a of the tape 30'. The inner end of the spring 70a is engaged in a slot 104 of a rotatable axial shaft 106. The outer end of the spring is engaged in a slot 108 of a fixed post 110. Opposite ends of shaft 106 are supported rotatably in recesses 112, 114 formed at inner sides of side walls 120, 122 constituting the housing plates 124, 126. The inner end of tape roll 38a is engaged in slot 128 of shaft 106. The outer turn T' of the tape passes over a guide fingers bar 125 depending from lens 58a and under the curved underside.

When the tape 30' is drawn out of opening 49 in the housing, the roll 38a rotates as it contracts. Spring 70a rotates as it contracts also, with its outer end remaining fixed in post 110. The scale on the reverse side 34' of the tape is read through lens when inside dimensions are taken with the tape. Scale 34' has graduated reading to compensate for the fluctuating length of the tape between lens 58a and the mouth 49 of the tape housing 40E. The rule R4 provides the advantage that a longer tape can be contained in a given size housing, since the coil spring is lateral of the tape roll rather than inside it as in the rule R1. It will be noted that tape 30' is wound in the opposite direction from spring 70a so that the spring is wound up and tensioned as the tape is withdrawn from the housing of the rule. Then when the tape is released the unwinding spring retracts the tape. High spring tension ensures that tape 38a will remain taut at all times, thereby ensuring that scale 34' which is graduated to compensate for the fluctuating distance between lens 58a and mouth 49, always reads the same at a given distance.

In FIGS. 20–22 is shown another rule R5 in which parts similar to those of rules R1–R4 are identically numbered. In rule R5 the outer end of coil spring 70b is engaged on a crank pin 130 of a rotatable crank arm 132. The arm is integral with a central axial shaft 106a. The shaft has a slot 128' in which in engaged the inner end of tape roll 38b. The inner end of the spring is secured in a slot 134 formed in a boss 136 integral with wall 120' of housing plate 124'. The shaft 106a has one end rotatably journaled in recess 112' in boss 136. The other end of shaft 106a is rotatably journaled in recess 114 of side wall 122 of the housing plate 126.

When the tape 30" is withdrawn from the housing 40f of rule R5, the spring 70b which is wound in opposite direction winds up with increasing tension as shaft 106a is rotated by the uncoiling tape roll 38b. When the tape is released the uncoiling spring retracts and winds up the tape. The outer turn T' of the tape is engaged on guide fingers 125 of lens 58a as in rule R4.

In FIGS. 23–26, the tape rule R6 is generally similar to rule R1 and corresponding parts are identically numbered. In housing 40f of this rule is a cylindrical cavity 150 formed inside housing plates 42', 44'. A hollow metal casing 152 is inserted in the cavity and contains a dry cell battery 154 arranged in a circuit C shown in FIG. 26. A coil spring 155 bears on the metal case of the battery and presses the positive terminal 156 into contact with a metal lug 158 mounted on one side of an insulated disk 160. On the other side of disk 160 is a lug 159 which is pressed into contact with terminal 161 of a lamp 162. The screw terminal 164 of the lamp is engaged in a flange 168 at the bottom end of the casing 152. The lamp is exposed at opening 49c in the housing just above the outer end of tape 30a. Rearwardly of opening 49c is a switch 170 seated in a recess 172. The switch has a spring-pressed lever arm 174 projecting downwardly so that it can be moved rearwardly when the hook 37' at the end of the tape is fully retracted into the opening 49c as shown in FIG. 24. The switch is then opened. When the tape is extended from the housing, the switch arm is released and the switch closes. A wire cable 180 extends from the switch along a groove 182 at the side of cavity 150. One branch wire 184 is connected to lug 158 through an opening 185 in the side of casing 152. Another branch wire 186 is connected to lug 159 through opening 185. A third insulated branch wire 188 extends laterally through a hole 189 and terminates at a lug 190 which is pressed into contact with the central terminal 191 of another lamp 192. The screw terminal 193 of the lamp is engaged in a threaded hole 194 at the top of the housing as shown in FIG. 25. An insulated screw plug 195 holds the lamp in the hole 194 and holds lug 190 in contact with the central terminal 191 of the lamp 192. The lamp 192 is located near lens 58b just above the inside reading scale 36 on side 34 of the tape turn T".

In circuit C of FIG. 26 switch 170 is shown open as it would be with the tape fully retracted in the position of FIG. 24. The switch is connected via wire 184 to lug 158 and via wire 185 to the positive terminal of battery 154. The negative terminal of the battery, which is the battery case, is grounded in the housing of the tape rule. The screw terminals 164 and 193 of lamps 165, 192, respectively, are grounded in the housing of the tape rule. The other terminal 161 of lamp 165 is connected via lug 159 and wire 186 to the terminal 198 of switch 170. The other terminal 191 of the lamp 192 is connected via lug 190 and wire 188 to terminal 198 of the switch. The two lamps are thus connected in parallel and are lighted when the tape is withdrawn from the housing 40f as switch 170 closes to illuminate the direct reading scale 32 on tape side 33 for measuring outside dimensions and to illuminate the direct reading scale 36 on tape side 34 for measuring inside dimensions. A tie bar 42" extending between the sides of the casing hold the tape T" over the portions 52a and 52b of the casing.

The housing 40f if desired may be provided with a thumb operated member 200, extending through a slot 202 in the wall of the housing for actuating a movable switch member 204 disposed adjacent the spring-pressed lever arm 174 and adapted to engage and move said lever arm away from the stationary switch member 170' of switch 170 thereby manually breaking the circuit through the lamp 162.

The tape rules R1–R6 embodying the various forms of the invention all have the common ability to provide accurate direct readings of measurements between inside points, without requiring arithmetic calculations involving the width of the housing or case of the tape rule. The several tape rules can be manufactured at low cost by well-known mass production machinery.

While I have illustrated and described the preferred embodiments of my invention, it is to be understood that I do not limit myself to the precise constructions herein disclosed and the various changes and modifications may be made within the scope of the invention as defined in the appended claims.

Having thus described my invention, what I claim is new, and desire to secure by United States Letters Patent is:

1. A tape device, comprising a flat, generally rectangular housing having an outlet at one end, a flexible tape coiled into a roll in said housing and withdrawable through said outlet for making measurements of length, said tape having a linear scale on one side thereof, a transparent window in said housing for viewing said scale on an outermost coil of said roll, a reference mark adjacent said window whereby the distance between the free end of the withdrawn tape and the other end of the housing is indicated by said scale at said window, another mark on the other side of said tape for direct reading of outside measurements made with said tape, and guide means in said housing so that the circumferential length of said outermost coil between said one end of the housing and the reference mark adjacent said window is maintained constant as the tape is withdrawn from the housing, said guide means comprising a first arcuate row of convex roller bearings inside the housing, and a second arcuate row of concave roller bearings concentric with and spaced from the first row, the bearings being in opposed relation, to define a narrow arcuate passage therebetween, said passage being curved in cross section, the curvature of the coils of the roll corresponding to that of said passage, whereby the outermost coil of the roll is movably guided in said passage between the roller bearings.

2. A tape device, comprising a flat, generally rectangular housing having an outlet at one end, a flexible tape coiled into a roll in said housing and withdrawable through said outlet for making measurements of length, said tape having a linear scale on one side thereof, a transparent window in said housing for viewing said scale on an outermost coil of said roll, a reference mark adjacent said window whereby the distance between the free end of the withdrawn tape and the other end of the housing is indicated by said scale at said window, another mark on the other side of said tape for direct reading of outside measurements made with said tape, and guide means in said housing so that the circumferential length of said outermost coil between said one end of the housing and the reference mark adjacent said window is maintained constant as the tape is withdrawn from the housing, a coil spring inside the housing located alongside the tape roll in axial alignment therewith, a rotatable shaft inside the housing extending axially of the tape roll and spring, the inner end of the tape roll being fixed to the shaft, the inner end of the spring being fixed inside the housing, and an arm radiating from the shaft, the outer end of the coil spring being fixed to the outer end of said arm, whereby the coil spring is tensioned while the tape is being withdrawn from the housing and whereby the tape is automatically retracted by the spring into the housing after the tape is withdrawn and then released.

3. A tape device, comprising a flat, generally rectangular housing having an outlet at one end, a flexible tape coiled into a roll in said housing and withdrawable through said outlet for making measurements of length, said tape having a linear scale on one side thereof, a transparent window in said housing for viewing said scale on an outermost coil of said roll, a reference mark adjacent said window whereby the distance between the free end of the withdrawn tape and the other end of the housing is indicated by said scale at said window, another mark on the other side of said tape for direct reading of outside measurements made with said tape, and guide means in said housing so that the circumferential length of said outermost coil between said one end of the housing and the reference mark adjacent said window is maintained constant as the tape is withdrawn from the housing, and a coil spring inside said housing located alongside the tape roll in axial alignment therewith, a rotatable shaft inside the housing extending axially of the tape roll and spring, inner ends of the tape roll and spring being fixed to said shaft, the outer end of the spring being fixed in the housing, the coil spring being wound in a direction opposite to the direction of winding of the tape roll, whereby the coil spring is tensioned while the tape is being withdrawn from the housing and whereby the tape is automatically retracted by the spring into the housing after the tape is withdrawn and released, said guide means comprising a first arcuate row of ball bearings inside the housing, a second arcuate row of ball bearings concentric with and spaced from the first row to define a passage therebetween, the outermost coil of the roll being movably guided by said ball bearings through said passage, and means rotatably supporting the ball bearings in the housing.

References Cited by the Examiner

UNITED STATES PATENTS

| | | | |
|---|---|---|---|
| 1,216,418 | 2/1917 | Crogan | 33—138 |
| 1,245,704 | 11/1917 | Gowrie | 33—138 |
| 1,276,311 | 8/1918 | Armbruster | 33—138 |
| 1,485,634 | 3/1924 | Schillman | 242—84.8 |
| 1,730,199 | 10/1929 | Farrand | 242—84.8 |
| 1,761,592 | 5/1930 | Seidel | 242—84.8 |
| 1,880,705 | 10/1932 | Bitner | 33—138 X |
| 1,964,248 | 5/1934 | Buck | 33—137 |
| 2,651,235 | 9/1953 | Barrows | 33—143 X |
| 2,837,296 | 5/1958 | Zelnick | 33—138 |
| 2,992,487 | 7/1961 | Miller | 33—138 |
| 3,004,346 | 10/1961 | Quenot | 33—138 |

FOREIGN PATENTS

| | | |
|---|---|---|
| 598,648 | 5/1925 | France. |
| 939,351 | 10/1961 | Great Britain. |

ISAAC LISANN, *Primary Examiner.*

B. A. DONAHUE, *Assistant Examiner.*